(12) United States Patent
Wu et al.

(10) Patent No.: US 10,952,135 B2
(45) Date of Patent: Mar. 16, 2021

(54) WLAN ACCESS METHOD AND APPARATUS

(71) Applicant: Huawei Technologies Co., Ltd., Shenzhen (CN)

(72) Inventors: Wenfu Wu, Shanghai (CN); Yan Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/419,796

(22) Filed: May 22, 2019

(65) Prior Publication Data

US 2019/0274099 A1    Sep. 5, 2019

Related U.S. Application Data

(63) Continuation of application No. 15/684,485, filed on Aug. 23, 2017, now Pat. No. 10,306,551, which is a continuation of application No. 14/666,830, filed on Mar. 24, 2015, now Pat. No. 9,763,183, which is a continuation of application No. PCT/CN2012/081837, filed on Sep. 24, 2012.

(51) Int. Cl.
*H04W 48/20* (2009.01)
*H04W 48/16* (2009.01)
*H04W 84/12* (2009.01)

(52) U.S. Cl.
CPC ........... *H04W 48/20* (2013.01); *H04W 48/16* (2013.01); *H04W 84/12* (2013.01); *Y02D 30/70* (2020.08)

(58) Field of Classification Search
CPC .................................................... H04W 48/20
See application file for complete search history.

(56) References Cited

U.S. PATENT DOCUMENTS

| 7,751,828 | B2 | 7/2010 | Kim et al. |
| 9,241,239 | B2 | 1/2016 | Manroa et al. |
| 2004/0156372 | A1 | 8/2004 | Hussa |
| 2009/0278705 | A1 | 11/2009 | Chhabra et al. |
| 2009/0310593 | A1 | 12/2009 | Sheynblat et al. |
| 2011/0154432 | A1 | 6/2011 | Basavaraj et al. |

(Continued)

FOREIGN PATENT DOCUMENTS

| CN | 101990274 A | 3/2011 |
| CN | 102037667 A | 4/2011 |

(Continued)

OTHER PUBLICATIONS

3rd Generation Partnership Project; Technical Specification Group Core Network and Terminals; Access to the 3GPP Evolved Packet Core (EPC) via non-3GPP access networks; Stage 3 (Release 11), 3GPP TS 24.302 V11.4.0, Sep. 2012, 61 pages.

(Continued)

*Primary Examiner* — Shukri Taha
(74) *Attorney, Agent, or Firm* — Slater Matsil, LLP

(57) ABSTRACT

The present application provides a WLAN access method. The method includes: obtaining an access location of a UE; obtaining AP access information of the UE at the access location; selecting an AP according to the obtained AP access information to access a WLAN; and sending AP access information of the selected AP to the UE. The present application further provides another WLAN access method and a corresponding apparatus.

16 Claims, 5 Drawing Sheets

(56) References Cited

U.S. PATENT DOCUMENTS

| | | | |
|---|---|---|---|
| 2011/0201360 A1* | 8/2011 | Garrett | H04W 64/003 |
| | | | 455/457 |
| 2011/0222523 A1 | 9/2011 | Fu et al. | |
| 2012/0302261 A1* | 11/2012 | Tinnakornsrisuphap | |
| | | | G01S 5/0252 |
| | | | 455/456.4 |
| 2013/0094390 A1* | 4/2013 | Chhabra | H04W 48/20 |
| | | | 370/252 |
| 2013/0310064 A1 | 11/2013 | Brachet et al. | |
| 2013/0322400 A1 | 12/2013 | Visuri et al. | |
| 2014/0120948 A1* | 5/2014 | Jin | H04W 64/00 |
| | | | 455/456.1 |
| 2015/0189557 A1* | 7/2015 | Touati | H04W 36/0066 |
| | | | 370/332 |
| 2019/0281500 A1* | 9/2019 | Cummings | H04W 28/18 |

FOREIGN PATENT DOCUMENTS

| | | |
|---|---|---|
| CN | 102656861 A | 9/2012 |
| EP | 1895799 A1 | 3/2008 |
| WO | 2011087267 A2 | 7/2011 |

OTHER PUBLICATIONS

Song, W.J., et al., "Improvements to Seamless Vertical Handover between Mobile WiMAX and 3GPP UTRAN through the Evolved Packet Core," LTE Part II: 3GPP Release 8, IEEE Communications Magazine, Apr. 2009, pp. 66-73.

\* cited by examiner

WLAN ACCESS METHOD AND APPARATUS

CROSS-REFERENCE TO RELATED APPLICATIONS

This application is a continuation of U.S. patent application Ser. No. 15/684,485, filed on Aug. 23, 2017, which is a continuation of U.S. patent application Ser. No. 14/666,830, filed on Mar. 24, 2015, now U.S. Pat. No. 9,763,183, which is a continuation of International Application No. PCT/CN2012/081837, filed on Sep. 24, 2012. All of the aforementioned patent applications are hereby incorporated by reference in their entireties.

TECHNICAL FIELD

The present application relates to the communication field, and in particular, to a WLAN (Wireless Local Area Network) access method and apparatus.

BACKGROUND

When needing to access a WLAN, a UE (User Equipment) continuously scans a nearby WLAN network to obtain a nearby WLAN AP (Access Point) list, and then selects a WLAN AP to access the WLAN network, so as to implement WLAN network access.

In the foregoing process, the UE needs to keep a WLAN network interface on, and needs to continuously scan the WLAN network. In this way, electric energy consumption of the UE is rather high.

SUMMARY

Embodiments of the present application provide a WLAN access method and apparatus, which can save electric energy of a UE.

For the purpose of achieving the foregoing objective, the following technical solution is adopted in the embodiments of the present application.

In one aspect, a WLAN access method is provided. The method includes obtaining an access location of a UE; obtaining AP access information of the UE at the access location; selecting an access point according to the obtained access point access information to access a wireless local area network; and sending AP access information of the selected AP to the UE.

In another aspect, a WLAN access method is provided. The method includes receiving AP access information from a network-side network element; and accessing a WLAN according to the received AP access information.

In another aspect, a WLAN access apparatus is provided. The apparatus includes an obtaining unit, configured to obtain an access location of a UE, where the obtaining unit is further configured to obtain AP access information of the UE at the access location; a processing unit, configured to select an access point according to the obtained access point access information to access a wireless local area network; and a sending unit, configured to send AP access information of the AP selected by the processing unit to the UE.

In another aspect, a UE is provided. The UE includes a receiving unit, configured to receive AP access information from a network-side network element; and an access unit, configured to access a WLAN according to the AP access information received by the receiving unit.

After the foregoing technical solution is adopted, in the WLAN access method, the WLAN access apparatus and the UE provided in the embodiments of the present application, the access location and the AP access information of the UE are obtained by using the network-side network element, an AP is selected from the obtained AP access information to access the WLAN, and the AP access information of the selected AP is sent to the UE. Therefore, the UE can enable a WLAN interface according to the received AP access information, so as to access the WLAN without keeping scanning the WLAN network, thereby achieving the objective of saving the electric energy of the UE.

BRIEF DESCRIPTION OF THE DRAWINGS

To illustrate the technical solutions in the embodiments of the present application more clearly, the following briefly introduces the accompanying drawings required for describing the embodiments. Apparently, the accompanying drawings in the following description show merely some embodiments of the present application, and a person of ordinary skill in the art may still derive other drawings from these accompanying drawings without creative efforts.

DETAILED DESCRIPTION OF ILLUSTRATIVE EMBODIMENTS

The following describes the technical solutions in the embodiments of the present application with reference to the accompanying drawings in the embodiments of the present application. Apparently, the described embodiments are merely a part rather than all of the embodiments of the present application. All other embodiments obtained by a person of ordinary skill in the art based on the embodiments of the present application without creative efforts shall fall within the protection scope of the present application.

Figure 1:
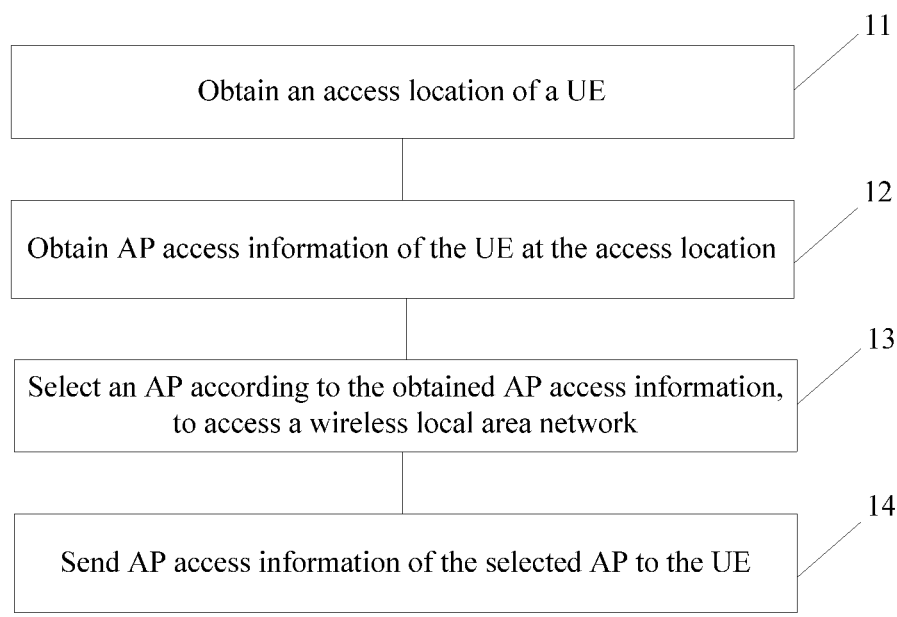
FIG. 1 is a flowchart of a WLAN access method according to an embodiment of the present application.

FIG. 1 is a flowchart of a WLAN access method according to an embodiment of the present application. Referring to FIG. 1, the embodiment of the present application provides a WLAN access method, and the WLAN access method is described based on a network-side access selection control network element. In the specification, the network-side access selection control network element refers to a type of network element having functions of access selection and control at the network side, for example, an ANDSF (Access Network Discovery and Selection Function), a PCRF (Policy and Charging Rule Function), an SDP (Service Delivery Platform), or an open platform. The method may include the following steps.

11. Obtain an access location of a UE.

In the embodiment of the present application, the network-side access selection control network element may obtain the access location of the UE in various ways. Specifically, the obtaining the access location of the UE may include receiving access location information of the UE from an access network element or a core network element, and obtaining the access location of the UE according to the access location information; or sending a location query request of the UE to an access network element or a core network element, receiving the access location information of the UE from the access network element or the core network element, and obtaining the access location of the UE according to the access location information.

It should be particularly pointed out that in the embodiment of the present application, the receiving the access location information of the UE from the access network element or the core network element, may include the following situations: receiving the access location information of the UE directly sent by the access network element or the core network element; and receiving the access location information of the UE, where the access location information is sent by the access network element or the core network element to an intermediate network element (for example, an PCRF network element) between the access network element or the core network element and the access selection control network element, and then is sent by the intermediate network element (for example, the access network element or the core network element sends the access location information of the UE to the PCRF, and then the PCRF sends the access location information of the UE to the network-side access selection control network element).

The access network element may be a BTS (Base Transceiver Station), a NodeB (base station), an eNodeB (Evolved Node B, evolved base station), a BSC (Base Station Controller), or an RNC (Radio Network Controller).

The core network element may be an SGSN (Serving GPRS Support Node), an MME (Mobility Management Entity), a GGSN (Gateway GPRS Support Node), or a PDN GW (Packet Data Network Gateway).

12. Obtain AP access information of the UE at the access location.

The AP access information includes information identifying the AP, for example, may include an SSID (Service Set Identifier) of the AP or an AP ID (access point identifier) of the AP.

In the embodiment of the present application, the network-side access selection control network element may obtain the AP access information of the UE at the access location in various ways. Specifically, the obtaining the AP access information of the UE at the access location may include receiving, by the access selection control network element, the AP access information from the access network element, and obtaining the AP access information of the UE at the access location according to the obtained access location information of the UE and the AP access information received from the access network element. Alternatively, obtaining the AP access information of the UE at the access location may include sending, by the access selection control network element, an AP access information query request to the access network element, where the AP access information query request includes the access location information of the UE, and receiving the AP access information of the UE at the access location from the access network element. In another example, obtaining the AP access information of the UE at the access location may include receiving, by the access selection control network element, configured AP access information, and obtaining the AP access information of the UE at the access location according to the obtained access location information of the UE and the configured AP access information.

Optionally, in an embodiment where the network-side access selection control network element is not an ANDSF, the obtaining AP access information of the UE at the access location in step 12 may further include sending an AP access information query request to the ANDSF, where the AP access information query request includes the access location information of the UE, and receiving the AP access information of the UE at the access location from the ANDSF.

13. Select an AP according to the obtained AP access information to access a wireless local area network.

In the embodiment of the present application, the selecting an AP according to the obtained AP access information to access a WLAN may include selecting one or multiple APs according to the obtained AP access information to access the WLAN. The selecting multiple APs to access the WLAN includes a situation of selecting all APs to access the WLAN.

Optionally, in an embodiment of the present application, the network-side access selection control network element may set conditions for the UE to access the WLAN, and the UE may access the WLAN only when meeting the conditions for accessing the WLAN. In this case, the selecting an AP according to the obtained AP access information to access a wireless local area network may include making the UE access the WLAN when the UE meets any one of the following specified conditions: a network charging package of the UE includes WLAN access; a service requested by the UE is allowed to access through the WLAN; and a user level of the UE is higher than a designated level.

The designated level may be various levels designated by a network operator based on its own rules, such as gold level and silver level.

14. Send AP access information of the selected AP to the UE. The AP access information may include the SSID of the AP or the AP ID of the AP.

Optionally, in an embodiment of the present application, the network-side access selection control network element selects an AP according to the obtained AP access information to access the WLAN. At this time, the sending AP access information of the selected AP to the UE in step 14 may include: sending the AP access information of the selected AP to the UE, so that the UE accesses the AP according to the access information of the UE. In this way, the network-side access selection control network element has designated the AP for the UE to access, and it is unnecessary for a user to perform selection, thereby simplifying user operations, avoiding inconvenience for a user to select an AP, and improving user experience.

Optionally, in an embodiment of the present application, the network-side access selection control network element may select multiple APs according to the obtained AP access information to access the WLAN. At this time, the sending access information of the selected AP to the UE may include: sending an AP access information list of the selected multiple APs to the UE, to enable the UE to select an AP from the AP access information list to perform access.

After receiving the AP access information from the network-side access selection control network element, the UE may enable a corresponding WLAN interface to access the WLAN. In this process, the UE may directly use the WLAN AP access information carried in a WLAN access request to access the WLAN network without scanning the nearby WLAN AP access information.

In the WLAN access method provided in the embodiment of the present application, the network-side access selection control network element obtains the access location and the AP access information of the UE, selects an AP from the obtained AP access information to access the WLAN, and sends the AP access information of the selected AP to the UE. Therefore, the UE can enable a corresponding WLAN interface according to the received AP access information, so as to access the WLAN without keeping scanning the WLAN network, thereby achieving the objective of saving electric energy of the UE.

Figure 2:
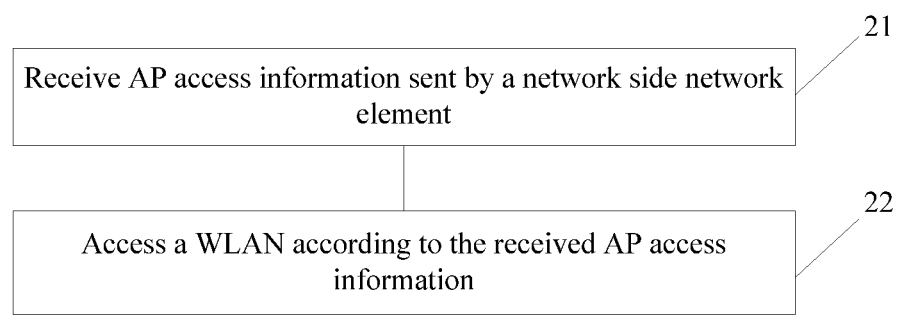
FIG. 2 is a flowchart of another WLAN access method according to an embodiment of the present application.

Correspondingly, an embodiment of the present application further provides a WLAN access method, and the WLAN access method is described based on the UE. Referring to FIG. 2, the method may include the following steps.

21. Receive AP access information from a network-side network element.

The AP access information may include an SSID of the AP or an AP ID of the AP. The AP access information may be AP access information of one AP, and of course, may also be an AP access information list of multiple APs (including all the APs).

22. Access a WLAN according to the received AP access information.

The UE may access a corresponding AP according to the SSID included in the AP access information, so as to access the WLAN.

In the WLAN access method provided in the embodiment of the present application, the UE can enable a corresponding WLAN interface according to the AP access information received from the network side, so as to access the WLAN without keeping scanning the WLAN network, thereby achieving the objective of saving electric energy of the UE.

When receiving the AP access information of only one AP, the UE may directly access the WLAN according to the AP access information of this AP. When the UE receives the AP access information list of multiple APs, the receiving AP access information from the network-side network element may include: receiving the AP access information list of multiple APs from the network-side network element. At this time, the accessing the WLAN according to the received AP access information may include selecting an AP to access the WLAN according to the AP access information list of multiple APs.

Optionally, when the UE receives the AP access information list of multiple APs, the UE may select an AP from the multiple APs to access the WLAN network as required. Specifically, the UE selecting an AP from the AP access information list of multiple APs to access the WLAN may include obtaining signal strength or loads of the APs corresponding to the AP access information list according to the AP access information list of multiple APs; and, according to the obtained signal strength or loads of the APs, selecting an AP with the strongest signal from the AP access information list of multiple APs to access the WLAN network, or, selecting an AP with the lowest load from the AP access information list of multiple APs to access the WLAN network.

In this way, the AP is selected with a clear purpose. When the AP with the strongest signal is selected to access the WLAN network, stability for accessing the WLAN network may be ensured, and network connection is not easily interrupted. When the AP with the lowest load is selected to access the WLAN network, loads of other APs may be lowered, so as to realize load balance.

For a better understanding of the present application, the present application will be further described by using several specific embodiments below as examples. It should be noted that steps in the following embodiments are further supplement to and explanation of the foregoing embodiments. It should also be noted that the following exemplified embodiments are merely a part of the embodiments of the present application. Based on the contents described in the present application, persons skilled in the art can easily think of other embodiments, which are all within the scope of the present application.

Embodiment 1

Figure 3A:
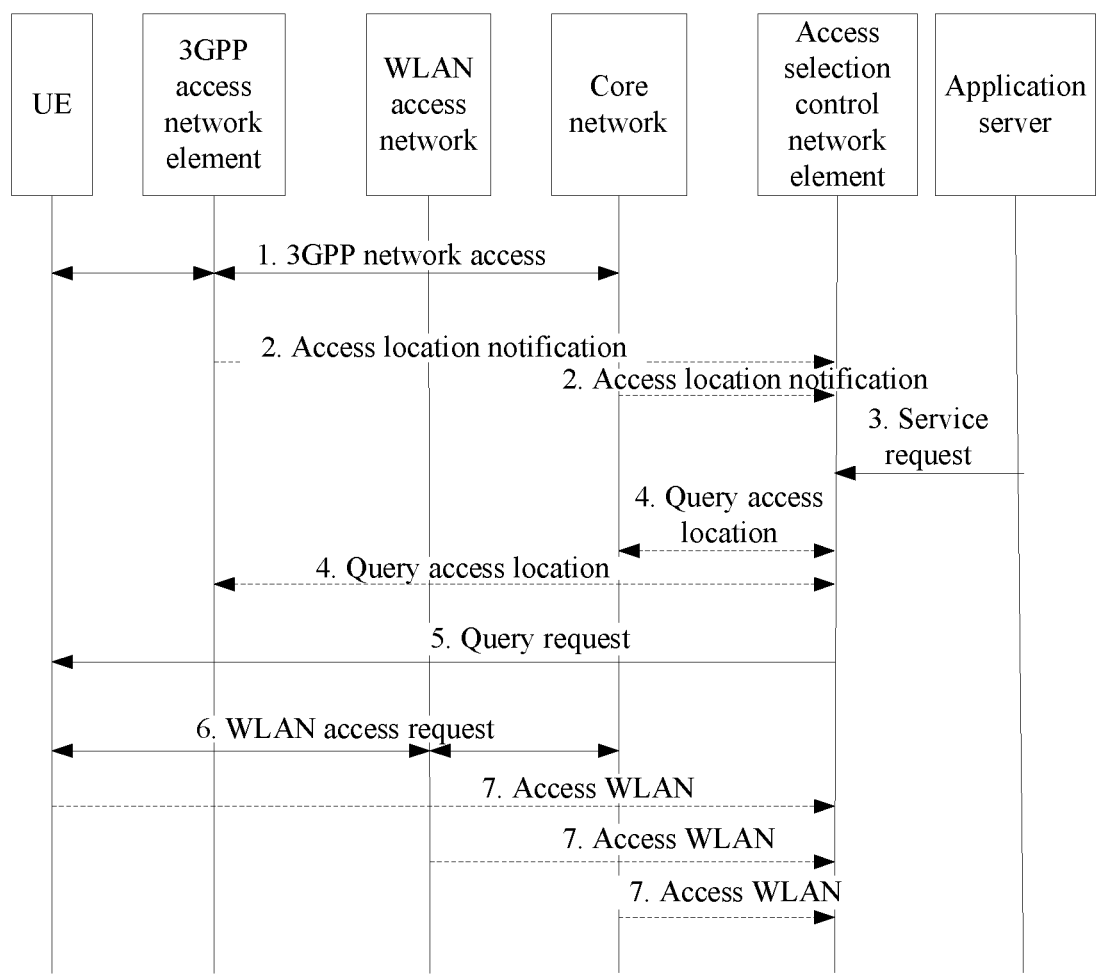
FIG. 3A is a schematic diagram of a WLAN access method according to an embodiment of the present application.

FIG. 3A is a schematic diagram of a WLAN access method according to an embodiment of the present application. Referring to FIG. 3A, the embodiment of the present application provides a WLAN access method, where the method may include the following steps.

1. A UE accesses a 3GPP network. The 3GPP network may be, for example, a GERAN (GSM/EDGE Radio Access Network) network, a UTRAN (UMTS Terrestrial Radio Access Network) network, or an E-UTRAN (Evolved UMTS Terrestrial Radio Access Network) network.

After the UE accesses the 3GPP network, a 3GPP access network element or a 3GPP core network element can obtain the access location information of the UE and notify the access selection control network element.

2. The 3GPP access network element or the 3GPP core network element notifies the access selection control network element (for example, an ANDSF, a PCRF, an SDP, or an open platform) of the access location information of the UE. The notification may be in a format of a message or a format of an API (Application Programming Interface). Optionally, in this step, the 3GPP access network element may further notify the access selection control network element of nearby WLAN AP access information of the UE access location.

The 3GPP access network element may be a BTS, a NodeB, an eNodeB, a BSC, or an RNC. The 3GPP core network element may be an SGSN, an MME, a GGSN, or a PDN GW.

The WLAN AP access information may include a WLAN SSID.

3. An application server sends service request information to the access selection control network element. The service request information may include information like a service type (such as a video service type, a voice service, or FTP (File Transfer Protocol) file downloading).

4. If the access selection control network element does not have the access location information of the UE, the access selection control network element acquires the access location information of the UE through query. Specifically, the access selection control network element sends a location query request to the 3GPP access network element or the 3GPP core network element; and the 3GPP access network element or the 3GPP core network element returns the access location information of the UE to the access selection control network element.

Certainly, if the access selection control network element already has the access location information of the UE (for example, the access location information of the UE is obtained in step 2), this step may be omitted.

5. After acquiring the access location information of the UE, the access selection control network element obtains WLAN AP access information of the UE at the access location, selects an AP according to the WLAN AP access information, and sends a WLAN access request to the UE, where the WLAN access request includes AP access information of the selected WLAN AP.

Specifically, the access selection control network element may obtain the WLAN AP access information of the UE at the access location in the following manners: the access selection control network element receives the WLAN AP access information reported by the 3GPP access network element, and obtains the WLAN AP access information of the UE at the access location according to the obtained access location information of the UE and the WLAN AP access information received from the access network element; or the access selection control network element sends a WLAN AP access information query request to the 3GPP access network element accessed by the UE, where the access information query request includes the access location information of the UE, and the 3GPP access network element accessed by the UE notifies the access selection control network element of the WLAN AP access information of the UE at the access location according to the access location information of the UE; or the access selection control network element is configured with the WLAN AP access information, and the access selection control network element obtains the WLAN AP access information of the UE at the access location according to the obtained access location information of the UE and the configured AP access information.

In this step, if WLAN APs exist near the UE access location, the access selection control network element selects a WLAN AP near the UE access location, and sends the WLAN access request to the UE, where the WLAN access request carries the access information (such as SSID or AP ID) of the WLAN AP selected by the network side. Specifically, the access selection control network element may select the WLAN AP in the following manners.

The access selection control network element selects a WLAN AP from the WLAN APs, and sends AP access information of this WLAN AP to the UE.

The access selection control network element selects several or all WLAN APs from the WLAN APs near the UE access location, and sends an AP access information list of the WLAN APs to the UE. The UE selects a WLAN AP from them to perform access.

In the embodiment of the present application, the access selection control network element can select WLAN access by referring to such information as a UE user level, a network charging package of a UE user, or a requested service type. For example: if the user level of the UE is higher than the designated level, the access selection control network element can select WLAN access. For example, when the designated level is a bronze user, the access selection control network element can select WLAN access for the UE user of gold user or silver user level, but cannot select WLAN access for a bronze user; or if the network charging package of the UE includes WLAN access, the access selection control network element can select WLAN access for the UE; and if the network charging package of the UE user does not include WLAN access, the access selection control network element cannot select WLAN access; or if the requested service is allowed to access through the WLAN network, the access selection control network element selects a WLAN network to perform access. For example, if the service requested by the UE is a video service, and the video service is allowed to access through the WLAN network, the access selection control network element can select WLAN access for the UE; and if the service requested by the UE is a voice service, and the voice service is not allowed to access through the WLAN network, the access selection control network element cannot select WLAN access.

6. After receiving the WLAN access request, the UE enables the WLAN network interface, and automatically selects a WLAN AP to access the WLAN network. The UE may perform selection in various ways. For example, the UE selects a WLAN AP with the strongest signal to access the WLAN network, or the UE selects a WLAN AP with the lowest load to access the WLAN network.

In this process, the UE may directly use the WLAN AP access information carried in the WLAN access request to access the WLAN network without scanning the nearby WLAN AP access information. In addition, the UE may directly detect signals or loads of WLAN APs corresponding to the WLAN AP access information carried in the WLAN access request without scanning the signals or loads of the nearby WLAN APs, so as to select a WLAN AP with the strongest signal or the lowest load to access the WLAN network.

7. The UE notifies the access selection control network element after accessing the WLAN network, and therefore, the access selection control network element learns that the UE accesses the WLAN network.

The access selection control network element may learn that the UE accesses the WLAN network in the following manners.

The UE directly notifies the access selection control network element that the UE has accessed the WLAN network.

The WLAN access network element or a gateway device (such as a GGSN or a PDN GW) in the core network learns that the UE accesses the WLAN network, and the WLAN access network element or the gateway device in the core network notifies the access selection control network element that the UE has accessed the WLAN network.

The interface between the network elements may be a message interface or an API interface.

In the WLAN access method provided in this embodiment, the network side selects WLAN network access for the UE, and instructs the UE to enable the WLAN network interface, thereby enabling the WLAN access as required, preventing the UE from keeping the WLAN network interface on, saving electric energy of the UE, and achieving the purpose of energy conservation and emission reduction. In addition, the network side can designate the UE to select a corresponding WLAN AP to access, avoiding inconvenience for a user to manually select the WLAN AP, and improving user experience.

Embodiment 2

Figure 3B:
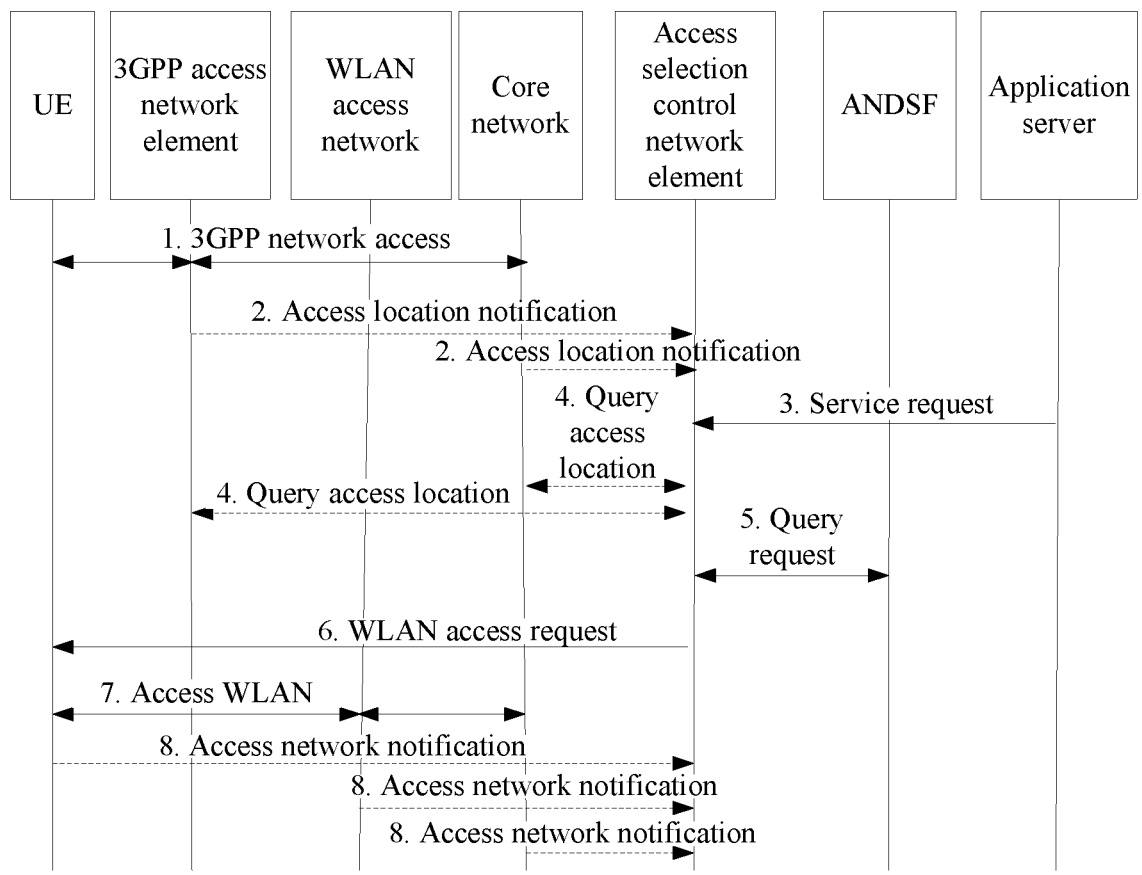
FIG. 3B is another schematic diagram of a WLAN access method according to an embodiment of the present application.

FIG. 3B is a schematic diagram of a WLAN access method according to an embodiment of the present application. Referring to FIG. 3B, the embodiment of the present application provides another WLAN access method. The method is roughly the same as the method in Embodiment 1, and only differences are described in detail below. The WLAN access method provided in this embodiment may include the following steps.

1-4. Same as steps 1-4 in Embodiment 1.

5. After learning the access location information of the UE, the access selection control network element obtains from the ANDSF the WLAN AP access information of the UE at the access location corresponding to the access location information. Specifically, the access selection control network element sends an AP access information query request to the ANDSF, where the access information query request carries the access location information of the UE, and the ANDSF returns the WLAN AP access information of the UE at the access location to the access selection control network element according to the access location information of the UE.

It is pointed out that the ANDSF may further obtain the WLAN AP access information of the UE at the access location by using the following methods. In one example, the ANDSF may be configured with the WLAN AP access information, and the ANDSF obtains the WLAN AP access information of the UE at the access location according to the access location information of the UE and the configured WLAN AP access information. Alternatively, the ANDSF may send an AP access information query request to the 3GPP access network element accessed by the UE, where the AP access information query request carries the access location information of the UE, and the 3GPP access network element accessed by the UE notifies the ANDSF of the WLAN AP access information of the UE at the access location according to the access location information of the UE. In this step, the ANDSF may further return ISRP (Inter-System Routing Policy, inter-system routing policy) information of the UE to the access selection control network element.

6. The access selection control network element selects a WLAN AP at the access location of the UE, and sends a WLAN access request to the UE, where the WLAN access request carries the access information (such as SSID or AP ID) of the WLAN AP selected by the network side.

Specifically, similar to Embodiment 1, the access selection control network element may select a WLAN AP in the following manners.

The access selection control network element selects a WLAN AP from the WLAN APs, and sends access information of this WLAN AP to the UE.

The access selection control network element selects several or all WLAN APs from the WLAN APs near the UE access location, and sends a WLAN AP access information list to the UE. The UE selects a WLAN AP from them to perform access.

In the embodiment of the present application, the access selection control network element can select WLAN access by referring to such information as a UE user level, a network charging package of a UE user, or a requested service type. For example: if the user level of the UE is higher than the designated level, the access selection control network element can select WLAN access. For example, when the designated level is a bronze user, the access selection control network element can select WLAN access for the UE user of a gold user or a silver user level, but cannot select WLAN access for the bronze user; or if the network charging package of the UE user includes WLAN access, the access selection control network element can select WLAN access for the UE; and if the network charging package of the UE does not include WLAN access, the access selection control network element cannot select WLAN access; or if the requested service is allowed to access through the WLAN network, the access selection control network element selects a WLAN network to perform access. For example, if the service requested by the UE is a video service, and the video service is allowed to access through the WLAN network, the access selection control network element can select WLAN access for the UE; and if the service requested by the UE is a voice service, and the voice service is not allowed to access through the WLAN network, the access selection control network element cannot select WLAN access. Whether the requested service is allowed to access through the WLAN network may be obtained from the obtained ISRP information.

7-8: Same as steps 6-7 in Embodiment 1.

It is pointed out that the access selection control network element in the embodiment is not an ADNSF, but may still be any other network elements described above.

In the WLAN access method provided in this embodiment, the network side selects WLAN network access for the UE, and instructs the UE to enable the WLAN network interface, thereby enabling the WLAN access as required, preventing the UE from keeping the WLAN network interface on, saving electric energy of the UE, and achieving the purpose of energy conservation and emission reduction. In addition, the network side may designate the UE to select a corresponding WLAN AP to access, avoiding inconvenience for a user to manually select the WLAN AP, and improving user experience.

Embodiment 3

Figure 3C:
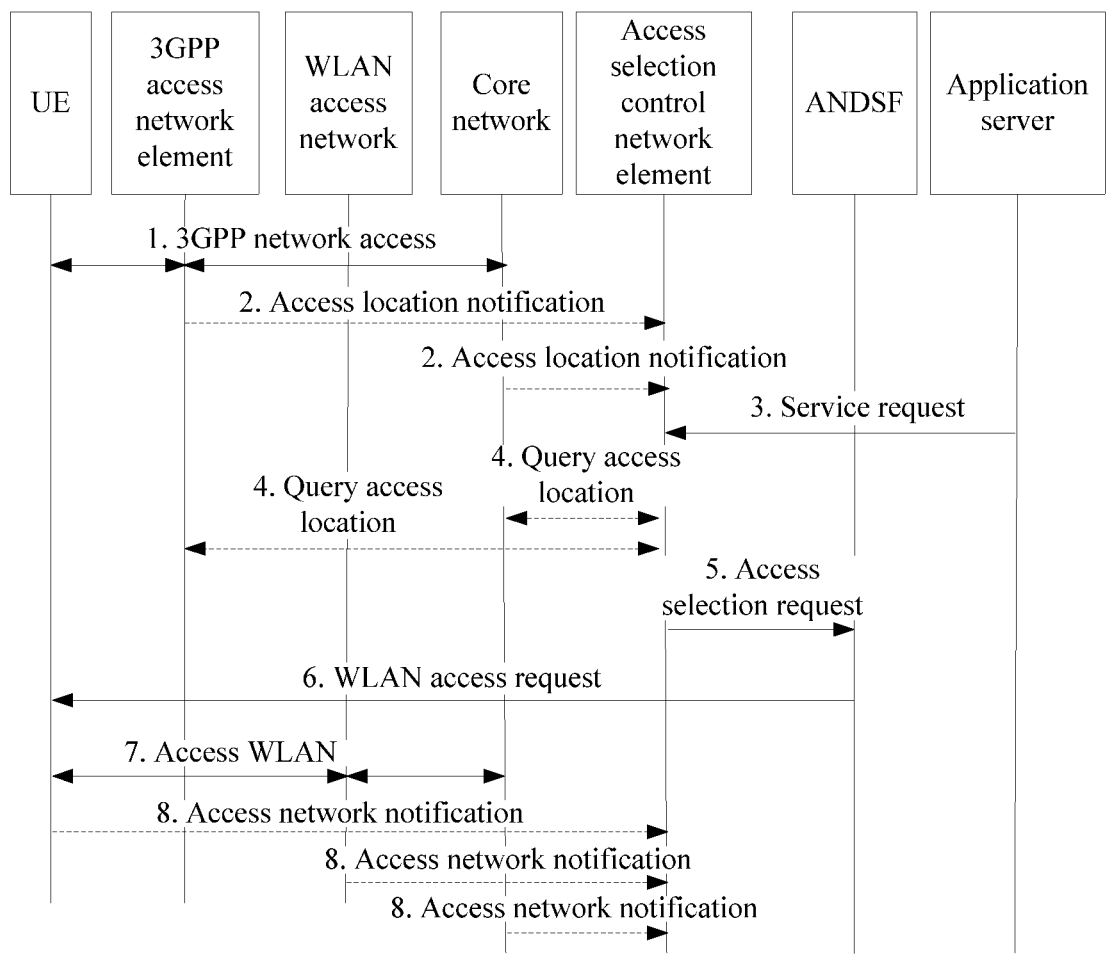
FIG. 3C is still another schematic diagram of a WLAN access method according to an embodiment of the present application.

FIG. 3C is a schematic diagram of a WLAN access method according to an embodiment of the present application. Referring to FIG. 3C, this embodiment provides another WLAN access method. The method is roughly the same as the method in Embodiment 1, and only differences are described in detail below. Referring to FIG. 3C, the WLAN access method provided in this embodiment includes the following steps.

1-4. Same as steps 1-4 in Embodiment 1.

5. After obtaining the access location information of the UE, the access selection control network element notifies the ANDSF of the access location information of the UE. In this step, the access selection control network element may also notify the ANDSF of the requested service type.

6. If WLAN APs exist at the UE access location, the ANDSF obtains the WLAN AP access information of the UE at the access location, selects an AP, and sends a WLAN access request to the UE, where the WLAN access request carries the AP access information (such as SSID or AP ID) of the AP selected by the network side.

It is pointed out that the ANDSF may obtain the WLAN AP access information of the UE at the access location by using the following methods.

The ANDSF is configured with the WLAN AP access information, and the ANDSF obtains the WLAN AP access information of the UE at the access location according to the access location information of the UE and the configured WLAN AP access information.

Alternatively, the ANDSF sends an AP access information query request to the 3GPP access network element accessed by the UE, where the AP access information query request carries the access location information of the UE, and the 3GPP access network element accessed by the UE notifies the ANDSF of the WLAN AP access information of the UE at the access location according to the access location information of the UE. In this step, the ANDSF may further return ISRP (Inter-System Routing Policy) information of the UE to the access selection control network element.

Similar to Embodiment 1, the ANDSF may select a WLAN AP in the following manners.

The access selection control network element selects a WLAN AP from the WLAN APs, and sends access information of this WLAN AP to the UE.

The access selection control network element selects several or all WLAN APs from the WLAN APs near the UE access location, and sends a WLAN AP access information list to the UE. The UE selects a WLAN AP from them to perform access.

In this embodiment, the access selection control network element can select WLAN access by referring to such information as a UE user level, a network charging package of a UE user, or a requested service type. For example: if the user level of the UE is higher than the designated level, the access selection control network element can select WLAN access. For example, when the designated level is a bronze user, the access selection control network element can select WLAN access for the UE user of a gold user or a silver user level, but cannot select WLAN access for a bronze user; or if the network charging package of the UE includes WLAN access, the access selection control network element can select WLAN access for the UE. I; if the network charging package of the UE does not include WLAN access, the access selection control network element cannot select WLAN access; or if the requested service is allowed to access through the WLAN network, the access selection control network element selects a WLAN network to perform access. For example, if the service requested by the UE is a video service, and the video service is allowed to access through the WLAN network, the access selection control network element can select WLAN access for the UE; and if the service requested by the UE is a voice service, and if the voice service is not allowed to access through the WLAN network, the access selection control network element cannot select WLAN access.

7-8. Same as steps 6-7 in Embodiment 1.

It is pointed out that the access selection control network element in the embodiment is not an ADNSF, but may still be any other network elements described above.

In the WLAN access method provided in this embodiment, the network side selects WLAN network access for the UE, and instructs the UE to enable the WLAN network interface, thereby enabling the WLAN access as required, preventing the UE from keeping the WLAN network interface on, saving electric energy of the UE, and achieving the purpose of energy conservation and emission reduction. In addition, the network side may designate the UE to select a corresponding WLAN AP to access, avoiding inconvenience for a user to manually select the WLAN AP, and improving user experience.

Figure 4:
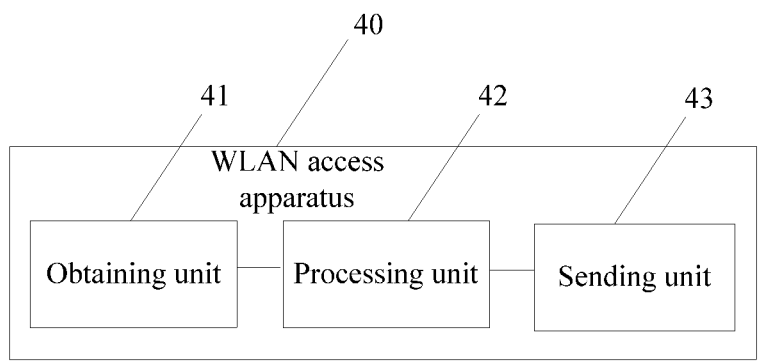
FIG. 4 is a structural block diagram of a WLAN access apparatus according to an embodiment of the present application.

Corresponding to the WLAN access method provided in the foregoing embodiments of the present application, an embodiment of the present application further provides a WLAN access apparatus 40. Referring to FIG. 4, the WLAN access apparatus 40 may include an obtaining unit 41, a processing unit 42, and a sending unit 43.

The obtaining unit 41 is configured to obtain an access location of a UE. The obtaining unit 41 is further configured to obtain AP access information of the UE at the access location.

The processing unit 42 is configured to select an AP according to the AP access information obtained by the obtaining unit 41 to access the WLAN. Specifically, the processing unit 42 may be configured to select one or more APs according to the AP access information obtained by the obtaining unit 41 to access the WLAN.

The sending unit 43 is configured to send AP access information of the AP selected by the processing unit 42 to the UE.

Optionally, in an embodiment, the processing unit 42 is configured to select an AP according to the AP access information obtained by the obtaining unit 41 to access the WLAN. In this case, the sending unit 43 is configured to send the AP access information of the AP selected by the processing unit 42 to the UE, to enable the UE to access the AP.

Optionally, in another embodiment, the processing unit 42 is configured to select multiple APs according to the AP access information obtained by the obtaining unit 41 to access the WLAN. In this case, the sending unit 43 is configured to send an AP access information list of the multiple APs selected by the processing unit 42 to the UE, to enable the UE to select an AP from the AP access information list to perform access.

Further, in an embodiment, the processing unit 42 may be configured to: select an access point to access the wireless local area network if a user level of the UE is higher than a designated level; or select an access point to access the wireless local area network if a charging package of the UE includes wireless local area network access; or select an access point to access the wireless local area network if a requested service is allowed to access through the wireless local area network.

It should be pointed out that the WLAN access apparatus provided in the embodiment of the present application may be an access selection control network element, where the access selection control network element may be a network element apparatus like an ANDSF, a PCRF, an SDP, or an open platform, which is not limited in the present application.

In an embodiment where the WLAN access apparatus is an access selection control network element, the obtaining unit 41 may be configured to: receive access location information of the UE from an access network element or a core network element, and obtain the access location of the UE according to the access location information; or send a location query request of the UE to the access network element or the core network element, receive access location information of the UE, which is sent by the access network element or the core network element in response to the location query request, and obtain the access location of the UE according to the access location information.

In the embodiment where the WLAN access apparatus is an access selection control network element, the obtaining unit 41 may be further configured to: receive the AP access information from the access network element, and obtain the AP access information of the UE at the access location according to the obtained access location information of the UE and the AP access information received from the access network element; or, send an AP access information query request to the access network element, where the AP access information query request carries the access location information of the UE, and receive the AP access information of the UE at the access location, which is sent by the access network element in response to the AP access information query request; or, receive configured access point access information, and obtain the WLAN AP access information of the UE at the access location according to the obtained access location information of the UE and the configured AP access information.

Optionally, when the access selection control network element is not an ANDSF, the obtaining unit 41 may be configured to: send an AP access information query request to the ANDSF, where the AP access information query request carries the access location information of the UE, and receive the AP access information of the UE at the access location, which is sent by the ANDSF in response to the AP access information query request.

In an embodiment where the WLAN access apparatus is an ANDSF, the obtaining unit 41 may be configured to:

receive the access location of the user equipment, which is sent by the access selection control network element and is obtained by the access selection control network element.

In an embodiment where the WLAN access apparatus is an ANDSF, the obtaining unit 41 may be further configured to: receive configured access point access location information, and obtain the access point access information of the user equipment at the access location according to the obtained access location of the user equipment and the configured access point access location information; or, send an access point access information query request to the access network element, where the access point access information query request includes the access location information of the UE, and receive the access point access information of the user equipment at the access location from the access network element.

In the WLAN access apparatus provided in the embodiment of the present application, the access location and the AP access information of the UE are obtained by using the network-side network element, an AP is selected from the obtained AP access information to access the WLAN, and the AP access information of the selected AP is sent to the UE. Therefore, the UE can enable a WLAN interface according to the received AP access information, so as to access the WLAN without keeping scanning the WLAN network, thereby achieving the objective of saving electric energy of the UE.

Figure 5:
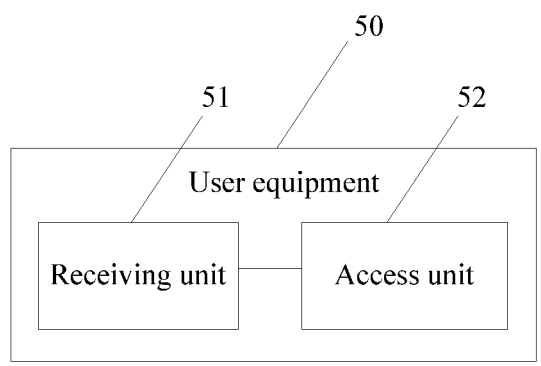
FIG. 5 is a structural block diagram of a UE according to an embodiment of the present application.

Corresponding to the WLAN access method provided in the foregoing embodiments of the present application, an embodiment of the present application further provides a UE 50. Referring to FIG. 5, the UE 50 includes a receiving unit 51 and an access unit 52.

The receiving unit 51 is configured to receive AP access information from a network-side network element.

The access unit 52 is configured to access a WLAN according to the AP access information received by the receiving unit 51.

If the network-side network element sends the AP access information of only one AP to the UE, the UE uses the AP access information of this AP to access the WLAN.

The UE provided in the embodiment of the present application can enable a corresponding WLAN interface according to the AP access information sent by the network side, so as to access the WLAN without keeping scanning the WLAN network, thereby achieving the objective of saving electric energy.

Optionally, in an embodiment of the present application, the access point access information is an access information list of multiple access points. In this case, the receiving unit 51 is configured to receive an AP access information list of the multiple APs from the network-side network element; and the access unit 52 is configured to select an AP from the AP access information list of the multiple APs received by the receiving unit 51 to access the WLAN.

Further, the access unit 52 may be specifically configured to obtain signal strength or loads of the APs corresponding to the AP access information list according to the AP access information list of the multiple APs; and select an AP with the strongest signal from the AP access information list of the multiple APs to access the wireless local area network, or, select an AP with the lowest load from the AP access information list of the multiple APs to access the wireless local area network.

It is pointed out that the WLAN access apparatus and the UE provided in the embodiments of the present application correspond to the WLAN access methods described above. Because the WLAN access methods are described in detail above, details are not provided herein again, and reference may be made to the foregoing embodiments of the WLAN access methods for corresponding content.

It should be noted that the units included in the embodiments of the WLAN access apparatus and the UE are divided only according to function logic. However, the division is not limited thereto so long as corresponding functions can be implemented. In addition, the specific name of each functional unit is only for the convenience of differentiation and is not intended to limit the protection scope of the present application.

A person of ordinary skill in the art may understand that all or a part of the steps of the methods in the foregoing embodiments may be implemented by a program instructing relevant hardware. The program may be stored in a computer readable storage medium, such as a read-only memory, a magnetic disk, or an optical disc.

The foregoing descriptions are merely specific embodiments of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method, comprising:
receiving, by a first network element, access location information of a user equipment from a core network element, wherein the first network element is a policy and charging rule function entity;
obtaining, by the first network element, a current access location of the user equipment using the access location information of the user equipment received from the core network element;
selecting, by the first network element, an access point according to the current access location of the user equipment, wherein selecting, by the first network element, the access point according to the current access location of the user equipment comprises:
obtaining, by the first network element, access point access information of the user equipment; and
selecting, by the first network element, the access point for the user equipment to use to access a wireless local area network according to the obtained access point access information of the user equipment and the current access location of the user equipment, wherein selecting the access point for the user equipment to use to access the wireless local area network according to the obtained access point access information of the user equipment and the current access location of the user equipment comprises:
selecting one or multiple access points for the user equipment to use to access the wireless local area network according to the obtained access point access information of the user equipment and the current access location of the user equipment; and
sending, by the first network element, access point access information of the selected access point to the user equipment, wherein:
when one access point is selected for the user equipment to use to access the wireless local area network, sending the access point access information of the selected access point to the user equipment comprises sending the access point access information of the selected one access point to the user equipment, for the user equipment to access the selected one access point; or when multiple access points are selected for the user equipment to use to access the wireless local area network, sending the access point access information of the selected access point to the user equipment comprises sending an access point access information list of the multiple access points to the user equipment for the user equipment to select the access point from the access point access information list to use to access the wireless local area network.

2. The method according to claim 1, wherein obtaining, by the first network element, the access point access information of the user equipment comprises:

receiving, by the first network element, the access point access information from a third network element, and obtaining the access point access information of the user equipment according to the obtained access location information of the user equipment and the access point access information received from the third network element, wherein the third network element is an access network element; or sending, by the first network element, an access point access information query request to the third network element, wherein the access point access information query request comprises the access location information of the user equipment, and receiving the access point access information of the user equipment from the third network element; or sending, by the first network element, an access point access information query request to an access network discovery and selection function (ANDSF), wherein the access point access information query request comprises the access location information of the user equipment, and receiving the access point access information of the user equipment from the ANDSF.

3. The method according to claim 1, wherein selecting the access point for the user equipment to use to access the wireless local area network according to the obtained access point access information of the user equipment further comprises:

selecting the access point for the user equipment to use to access the wireless local area network when a user level of the user equipment is higher than a designated level; or selecting the access point for the user equipment to use to access the wireless local area network when a charging package of the user equipment comprises wireless local area network access; or selecting the access point for the user equipment to use to access the wireless local area network when a requested service is allowed to access through the wireless local area network.

4. A method, comprising:

receiving, by a user equipment (UE), access point access information of a selected access point from a first network-side network element, wherein the first network-side network element determines the access point access information of the selected access point using access location information of the UE received from a core network element, the first network-side network element learns a current access location of the UE from the access location information of the UE, the first network-side network element is a policy and charging rule function entity, the first network-side network element selects the selected access point by obtaining access point access information of the UE and selecting one or multiple access points for the user equipment for the UE to use to access a wireless local area network according to the obtained access point access information of the UE and the current access location of the UE, and wherein when the first network-side network element selects one access point for the UE to use to access the wireless local area network, the first network-side network element sends the access point access information of the selected one access point to the UE for the UE to access the selected one access point; or when the first network-side network element selects multiple access points for the UE to use to access the wireless local area network, the first network-side network element sends an access point access information list of the multiple access points to the UE for the UE to select the access point from the access point access information list to use to access the wireless local area network; and accessing, by the UE, the wireless local area network according to the received access point access information.

5. The method according to claim 4, wherein:

the access point access information comprises the access point access information list of the multiple access points;

receiving the access point access information from the first network-side network element comprises receiving the access point access information list of the multiple access points from the first network-side network element; and accessing the wireless local area network according to the received access point access information comprises selecting an access point to access the wireless local area network according to the access point access information list of the multiple access points.

6. The method according to claim 5, wherein selecting the access point to access the wireless local area network according to the access point access information list of the multiple access points comprises:

obtaining, according to the access point access information list of the multiple access points, signal strength or loads of access points corresponding to the access point access information list; and selecting an access point with the strongest signal from the access point access information list of the multiple access points to access the wireless local area network, or selecting an access point with the lowest load from the access point access information list of the multiple access points to access the wireless local area network.

7. An apparatus, configured to act as a first network element, the apparatus comprising:

a non-transitory memory storage comprising instructions; and one or more processors in communication with the non-transitory memory storage, wherein the one or more processors are configured to execute the instructions to:

receive access location information of a user equipment from a core network element, wherein the apparatus is a policy and charging rule function entity;

obtain a current access location of the user equipment using the access location information of the user equipment received from the core network element;

select an access point according to the current access location of the user equipment, wherein selecting the access point according to the current access location of the user equipment comprises:

obtaining access point access information of the user equipment; and selecting the access point for the user equipment to use to access a wireless local area network according to the obtained access point access information of the user equipment and the current access location of the user equipment, wherein selecting the access point for the user equipment to use to access the wireless local area network according to the obtained access point access information of the user equipment and the current access location of the user equipment comprises:

selecting one or multiple access points for the user equipment to use to access the wireless local area network according to the obtained access point access information of the user equipment and the current access location of the user equipment; and send access point access information of the selected access point to the user equipment, wherein:

when one access point is selected for the user equipment to use to access the wireless local area network, sending the access point access information of the selected access point to the user equipment comprises sending the access point access information of the selected one access point to the user equipment, for the user equipment to access the selected one access point; or when multiple access points are selected for the user equipment to use to access the wireless local area network, sending the access point access information of the selected access point to the user equipment comprises sending an access point access information list of the multiple access points to the user equipment for the user equipment to select the access point from the access point access information list to use to access the wireless local area network.

8. The apparatus according to claim 7, wherein the one or more processors being configured to execute the instructions to obtain the access point access information of the user equipment comprises the one or more processors being configured to execute the instructions to:

receive the access point access information from a third network element, and obtain the access point access information of the user equipment according to the obtained access location information of the user equipment and the access point access information received from the third network element, wherein the third network element is an access network element; or send an access point access information query request to the third network element, wherein the access point access information query request comprises the access location information of the user equipment, and receive the access point access information of the user equipment from the third network element; or send an access point access information query request to an access network discovery and selection function (ANDSF), wherein the access point access information query request comprises the access location information of the user equipment, and receive the access point access information of the user equipment from the ANDSF.

9. The apparatus according to claim 7, wherein the one or more processors being configured to execute the instructions to select the access point for the user equipment to use to access the wireless local area network according to the obtained access point access information of the user equipment comprises the one or more processors being configured to execute the instructions to:

select the access point for the user equipment to use to access the wireless local area network when a user level of the user equipment is higher than a designated level; or select the access point for the user equipment to use to access the wireless local area network when a charging package of the user equipment comprises wireless local area network access; or select the access point for the user equipment to use to access the wireless local area network when a requested service is allowed to access through the wireless local area network.

10. A user equipment, comprising:

a non-transitory memory storage comprising instructions; and one or more processors in communication with the non-transitory memory storage, wherein the one or more processors are configured to execute the instructions to:

receive access point access information of a selected access point from a first network-side network element, wherein the first network-side network element determines the access point access information of the selected access point using access location information of the UE received from a core network, the first network-side network element learns a current access location of the UE from the access location information of the UE, the first network-side network element is a policy and charging rule function entity, the first network-side network element selects the selected access point by obtaining access point access information of the UE and selecting one or multiple access points for the user equipment for the UE to use to access a wireless local area network according to the obtained access point access information of the UE and the current access location of the UE, and wherein when the first network-side network element selects one access point for the UE to use to access the wireless local area network, the first network-side network element sends the access point access information of the selected one access point to the UE for the UE to access the selected one access point; or when the first network-side network element selects multiple access points for the UE to use to access the wireless local area network, the first network-side network element sends an access point access information list of the multiple access points to the UE for the UE to select the access point from the access point access information list to use to access the wireless local area network; and access the wireless local area network according to the received access point access information.

11. The user equipment according to claim 10, wherein:

the access point access information comprises the access point access information list of multiple access points; and the one or more processors are configured to execute the instructions to:

receive the access information list of the multiple access points from the first network-side network element; and select an access point from the access point access information list of the multiple access points to access the wireless local area network.

12. The user equipment according to claim 11, wherein the one or more processors are configured to further execute the instruction to:

obtain, according to the access point access information list of the multiple access points, signal strength or loads of access points corresponding to the access point access information list; and select an access point with the strongest signal from the access point access information list of the multiple access points to access the wireless local area network, or select an access point with the lowest load from the access point access information list of the multiple access points to access the wireless local area network.

13. The method according to claim 1, wherein obtaining, by the first network element, the access point access information of the user equipment comprises:

receiving, by the first network element, configured access point access information, and obtaining the access point access information of the user equipment according to the obtained access location information of the user equipment and the configured access point access information.

14. The apparatus according to claim 7, wherein the one or more processors being configured to execute the instructions to obtain the access point access information of the user equipment comprises the one or more processors being configured to execute the instructions to:

receive configured access point access information, and obtain the access point access information of the user equipment according to the obtained access location information of the user equipment and the configured access point access information.

15. The method according to claim 1, further comprising:

sending, by the core network element, the access location information of the user equipment to the first network element.

16. A system, comprising:

the apparatus according to claim 7; and the core network element, wherein the core network element is configured to send the access location information of the user equipment to the first network element.

* * * * *